(12) United States Patent
Yoshida

(10) Patent No.: US 9,626,934 B2
(45) Date of Patent: Apr. 18, 2017

(54) DISPLAY FORMAT USING DISPLAY DEVICE FOR MACHINE-READABLE DOT PATTERNS

(76) Inventor: Kenji Yoshida, Tokyo (JP)

(*) Notice: Subject to any disclaimer, the term of this patent is extended or adjusted under 35 U.S.C. 154(b) by 408 days.

(21) Appl. No.: 13/992,952

(22) PCT Filed: Dec. 8, 2011

(86) PCT No.: PCT/JP2011/078482
§ 371 (c)(1),
(2), (4) Date: Jun. 10, 2013

(87) PCT Pub. No.: WO2012/077766
PCT Pub. Date: Jun. 14, 2012

(65) Prior Publication Data
US 2013/0249933 A1 Sep. 26, 2013

(30) Foreign Application Priority Data
Dec. 9, 2010 (JP) .................. 2010-274313

(51) Int. Cl.
| | |
|---|---|
| G09G 5/02 | (2006.01) |
| G09G 5/00 | (2006.01) |
| G06K 19/06 | (2006.01) |
| H04N 21/478 | (2011.01) |
| H04N 21/8358 | (2011.01) |
| H04N 21/858 | (2011.01) |
| H04N 21/44 | (2011.01) |
| H04N 1/32 | (2006.01) |

(Continued)

(52) U.S. Cl.
CPC ....... *G09G 5/005* (2013.01); *G06K 19/06037* (2013.01); *G06T 1/0028* (2013.01);
(Continued)

(58) Field of Classification Search
CPC ..... G06K 9/00885; G06K 9/36; G06K 9/6202
(Continued)

(56) References Cited

U.S. PATENT DOCUMENTS 6,574,364 B1 * 6/2003 Economidis ........... H04N 1/644
348/E5.101
6,621,973 B1 * 9/2003 Hoffman .............. G02B 6/0096
385/125

(Continued)

FOREIGN PATENT DOCUMENTS

| JP | 8-16708 A | 1/1996 |
| JP | 2005-38181 A | 2/2005 |

(Continued)

OTHER PUBLICATIONS

International Search Report for PCT/JP2011/078482, mailing date of May 22, 2012.

*Primary Examiner* — Kavid A Amini
(74) *Attorney, Agent, or Firm* — Westerman, Hattori, Daniels & Adrian, LLP

(57) ABSTRACT

The present invention has a technical objective of providing a distinctive display format for machine-readable dot patterns which does not harm the aesthetics of images displayed on a display device. The dot pattern is made machine readable by providing the periphery of dots with a contrast control region and/or an anti-aliasing region which are distinguishable from the surrounding image. Thus enabled is the embedding of the two-dimensional codes which cannot be recognized by audiences yet machine readable on video or images on the screen of a display device. An audience can easily acquire information defined by the dot patterns using a digital camera, a video camera, a portable telephone camera, a web camera, or the like to image the screen of the display device or to capture the screen as data.

27 Claims, 11 Drawing Sheets

(51) Int. Cl.
*G06T 1/00* (2006.01)
*H04N 7/025* (2006.01)
*H04N 7/08* (2006.01)

(52) U.S. Cl.
CPC .......... *G09G 5/02* (2013.01); *H04N 1/32144* (2013.01); *H04N 21/44008* (2013.01); *H04N 21/47815* (2013.01); *H04N 21/8358* (2013.01); *H04N 21/8586* (2013.01); *G06T 2201/0051* (2013.01); *H04N 7/025* (2013.01); *H04N 7/08* (2013.01)

(58) Field of Classification Search
USPC ........................................................ 345/629
See application file for complete search history.

(56) References Cited

U.S. PATENT DOCUMENTS

| 6,732,927 B2* | 5/2004 | Olsson | G06F 3/0317 |
| | | | 235/454 |
| 2005/0173544 A1* | 8/2005 | Yoshida | G06F 3/0317 |
| | | | 235/494 |
| 2006/0086796 A1* | 4/2006 | Onogi | G06K 7/10712 |
| | | | 235/454 |
| 2007/0195229 A1* | 8/2007 | Kuribayashi | G02F 1/133514 |
| | | | 349/106 |
| 2010/0246984 A1* | 9/2010 | Cheong | G06T 1/005 |
| | | | 382/233 |
| 2011/0002012 A1* | 1/2011 | Amagai | G06K 19/06046 |
| | | | 358/3.28 |

FOREIGN PATENT DOCUMENTS

| JP | 2005-159569 A | 6/2005 |
| JP | 3706385 B2 | 10/2005 |
| JP | 2006-20144 A | 1/2006 |
| JP | 3771252 B1 | 4/2006 |
| JP | 2006-128900 A | 5/2006 |
| JP | 2007-26428 A | 2/2007 |
| JP | 2007-36833 A | 2/2007 |
| JP | 2009-516259 A | 4/2009 |
| JP | 2009-278520 A | 11/2009 |
| JP | 4478992 B1 | 6/2010 |
| JP | 2010-268140 A | 11/2010 |
| WO | 2004/084125 A1 | 9/2004 |

* cited by examiner

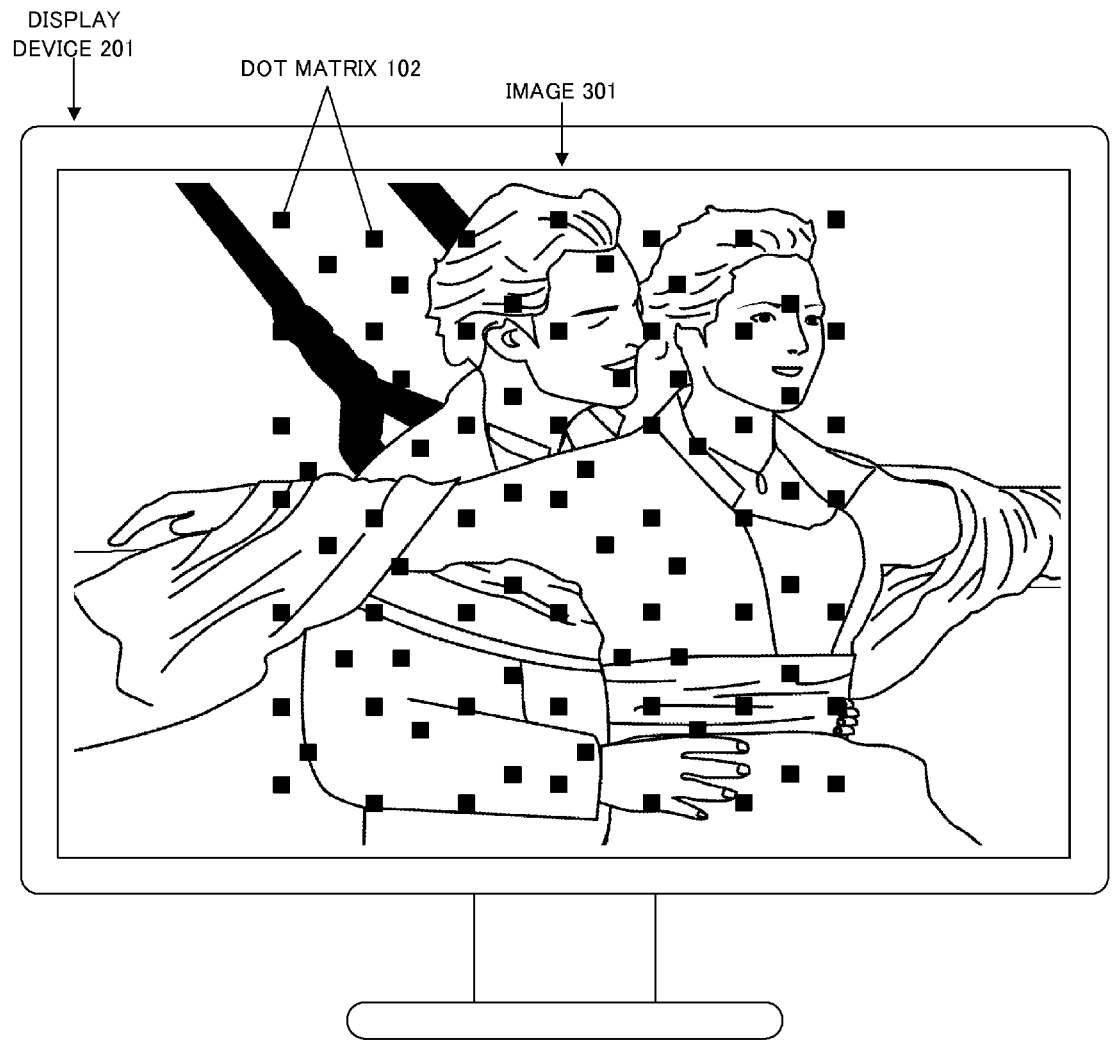

CONTRAST CONTROL REGION 104
DOT 103
SURROUNDING PIXEL REGION 106

ANTI-ALIASING REGION 105
DOT 103
SURROUNDING PIXEL REGION 106

DISPLAY FORMAT USING DISPLAY DEVICE FOR MACHINE-READABLE DOT PATTERNS

FIELD OF THE INVENTION

The present invention relates to a display format which allows a display device to display dot patterns as a kind of two-dimensional codes in a machine-readable condition.

BACKGROUND OF THE INVENTION

Adding information to video (a moving image) or an image (a still image) is easily realized by drawing a two-dimensional code in the image.

In Japanese Unexamined Patent Application Publication No. 2005-159569, a two-dimensional barcode is displayed on a television monitor during a television shopping program, a television commercial, and the like. When a portable terminal reads out the two-dimensional barcode, the portable terminal acquires a Uniform Resource Locator (URL) for ordering products and services and accesses the server of the vendor of the teleshopping system. Then, after exchanges between the server and the portable terminal, the order details are confirmed.

Publications of Japanese Patents No. 3706385 and No. 3771252 disclose dot patterns as two-dimensional codes which can be superimposediy printed on images.

Japanese Unexamined Patent Application Publication No 2007-36833 discloses a method of embedding a digital watermark in one frame of video.

Publication of Japanese Patent No. 4478992 discloses an influence that pixel information embedded in one frame of video as an index is affected by irreversible compression.

Patent Literature 1: Japanese Unexamined Patent Application Publication No. 2005-159569
Patent Literature 2: Publication of Japanese Patent No. 3706385
Patent Literature 3: Publication of Japanese Patent No. 3771252
Patent Literature 4: Japanese Unexamined Patent Application Publication No. 2007-36833
Patent Literature 5: Publication of Japanese Patent No. 4478992

SUMMARY OF THE INVENTION

Problems that the Invention is to Solve

However, since the two-dimensional code used in Japanese Unexamined Patent Application Publication No. 2005-159569 occupies a certain area of a television screen as it is obvious from the drawings of Japanese Unexamined Patent Application Publication No. 2005-159569, there is a problem of harming the aesthetics of the television program.

Also, while Publications of Japanese. Patents No. 3706385 and No. 3771252 disclose techniques of reading printed dot patterns, there is a technical problem inherent to inputting and outputting information by reading dot patterns displayed on a screen of a display device.

The present invention has been made in consideration of these problems. The present invention has a technical objective to provide a unique display format of machine-readable dot patterns, which does not harm the aesthetics of an image displayed on a display device.

Means to Solve the Problems

<1> In the display format using a display device for machine-readable dot patterns of the present invention, the display format is for displaying, using the display device, the machine-readable dot pattern where a plurality of dots are arranged in accordance with a predetermined rule over a whole region or at least one predetermined region of at least a predetermined frame, and the plurality of dots comprise a plurality of information dots or the plurality of information dots and reference dots.

<2> Preferably, a contrast control region which is distinguishable from the dots is provided between the dots and the surrounding pixel region.

<3> Preferably, between the dots and a surrounding pixel region or between the contrast control region and the surrounding pixel region is provided an anti-aliasing region were pixel colors gradually change from the pixel colors of the surrounding pixel region to the pixel color of the dots or to the pixel color of the contrast control region.

<4> Preferably, the pixel color of the contrast control region is a complimentary color of the pixel color of the dots.

<5> Preferably, (i) the pixel color of the contrast control region is an achromatic color, and the pixel color of the dots is a chromatic color; or (ii) the pixel color of the contrast control region is a chromatic color, and the pixel color of the dots is an achromatic color.

<6> Preferably, (i) the pixel color of the contrast control region is white, and the pixel color of the dots is black; or (ii) the pixel color of the contrast control region is black, and the pixel color of the dots is white.

<7> Preferably, the pixel color of the dots is distinguishable from the pixel colors of the surrounding pixel region.

<8> Preferably, the pixel color of the contrast control region is distinguishable from the pixel colors of the surrounding pixel region, and the pixel color of the dots is distinguishable from the pixel color of the contrast control region.

<9> Preferably, in the machine-readable dot pattern, a dot code is defined by determining: a region where the dot code and/or a set of X and Y coordinates are defined; an orientation of the dot pattern; and arrangements of the information dots, with reference to the reference dots arranged in accordance with the predetermined rule.

<10> Preferably, a plurality of the machine-readable dot patterns, in each of which the dot code and/or X and Y coordinates are defined, are provided in the predetermined region by coupling or abutting one another in vertical and horizontal directions.

<11> In the machine-readable dot pattern, the dot code and/or X and Y coordinates are defined by the pixel colors of the dots and/or the contrast control region.

<12> Whether the machine-readable dot pattern is being displayed or not can be judged by whether or not the plurality of information dots or the plurality of information dots and reference dots are arranged at a predetermined position in the predetermined frame.

<13> Preferably, when displaying the machine-readable of pattern, an index for identifying an image displayed on the display device is displayed in a same frame as a frame displaying the machine-readable dot pattern.

Advantageous Effect of the Invention

According to the present invention, machine-readable dot patterns can be appropriately displayed on a display device.

According to the present invention, having a contrast control region and/or an anti-aliasing region, dots can be firmly recognized even if a compressed video and image is broadcasted or reproduced.

Also, using dot patterns, as each dot is small, two-dimensional codes which are unviewable to audiences yet machine-readable can be embedded in video or images on a screen of a display device.

In this way, information defined in the dot pattern can be easily obtained by imaging the screen of the display device or capturing the screen as data, using a camera for recording visible light such as digital cameras, video cameras, portable telephone cameras, web cameras, and the like.

Further, having a plurality of dot patterns, where dot codes and/or X and Y coordinates are defined, coupling and connecting one another in vertical and horizontal directions, the information can be acquired by imaging or capturing only part of the screen of the display device.

BRIEF DESCRIPTION OF THE DRAWINGS

FIG. 8 is a diagram showing information which can be defined by the dot pattern 101;

FIG. 9 is a diagram showing an example of displaying the dot pattern 101 on the display device 201;

DETAILED DESCRIPTION OF PREFERRED EMBODIMENTS

Figure 1:
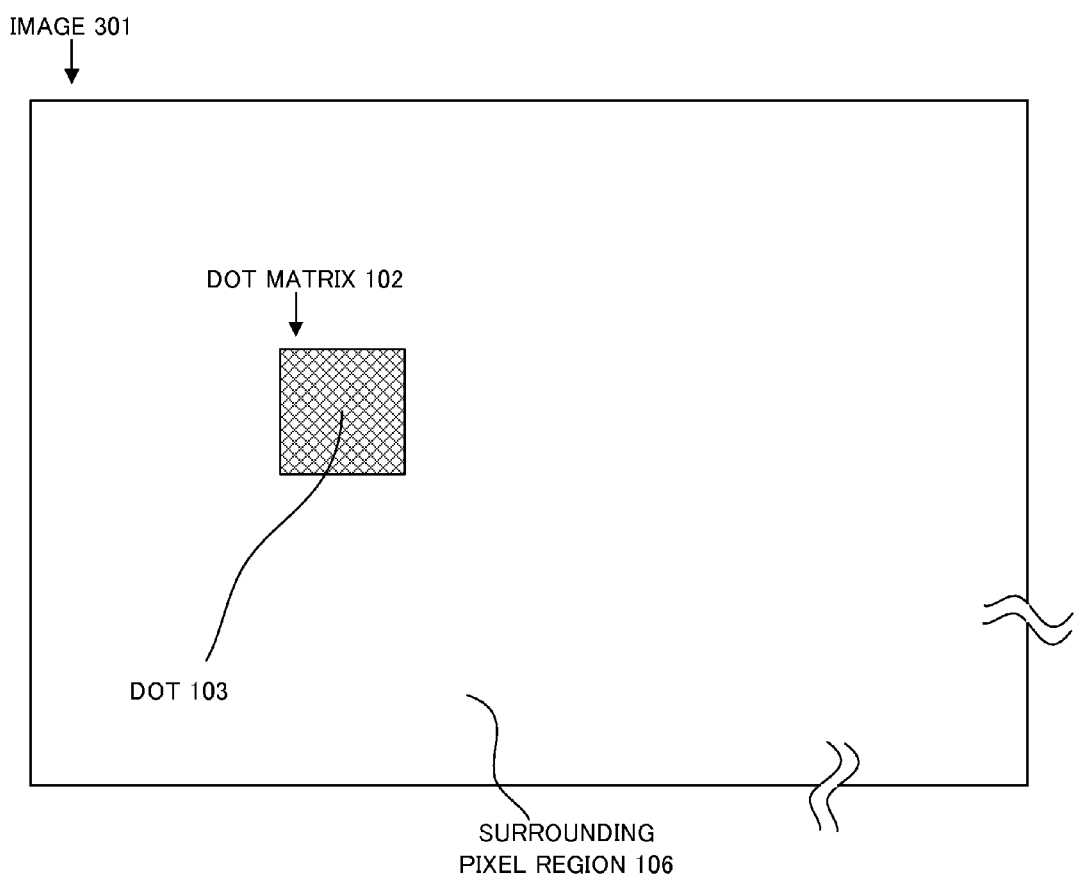
FIG. 1 is a diagram showing a dot matrix 102 of a first embodiment.

The following will describe embodiments of the present invention with reference to the drawings.

To summarize the present invention, since dots and a surrounding image are hard to be distinguished when broadcasting and reproducing video or an image, the dot pattern is made machine-readable by providing, around the dots, a contrast control region and/or an anti-aliasing region which are distinguishable from the surrounding image. Further, in the dot pattern, a dot code is defined by determining: a region where the dot code and/or a set of X and Y coordinates are defined; an orientation of the dot pattern; and arrangements of the information dots, with reference to the reference dots arranged in accordance with the predetermined rule, so that the dot code can be read based on whether or not a dot exists at a location where the dot is supposed to be located.

<Display Format of Dots>

The following will describe dots 103 comprising the dot pattern. 101 displayed on the display device 201.

It should be noted that, while "dots" are sometimes equivalent to pixels in the technical field of display devices, dots 103 in this invention means dots as elements constituting the dot pattern 101, based on a different concept from the "dots" as pixels of display devices.

In the present invention, dots themselves as constituents of a dot pattern 101 are referred to as "dots 103" Also, dots which are actually displayed on the display device 201 using the display format of the present invention are referred to as a "dot matrix 102."

A region in an image 301 other than a region occupied by the dot matrix 102 is referred to as a surrounding pixel region 106 in this invention.

First Embodiment

The display format of a dot matrix 102 of the first embodiment will be described.

FIG. 1 is a diagram showing a dot matrix 102 comprising the dot pattern 101 displayed on a display device 201 in the first embodiment.

The dot matrix 102 comprises only clots 103.

<Dots>

The dots 103 will be described in details. It should be noted that this explanation of the dots will also be valid to the following other embodiments.

The color of the dots 10$ will be determined in relation with a surrounding pixel region 106. That is, a pixel color distinguishable from the pixel colors of the surrounding pixel region 106 will be used. A color which is not used in the surrounding pixel region 108 is most preferably used.

In the display format of the present invention, the arrangement of a dot matrix 102 is recognized by RGB values of the dots 103.

The dot pattern 101 can be appropriately imaged and recognized using a general use camera with a display device, of any size when the sizes of the dots 103 are approximately 2 to 4 pixels×2 to 4 pixels and the interval between the reference dots is approximately 10 to 40 pixels, excluding one pixel affected by a disorder of the display device and in consideration of the influences from the surrounding pixel region 106, even in a case in which the compression standard of the image or video including the dot pattern 101 is irreversible compression. It should be noted that, when dots are large or the size of the dots are relatively larger for the interval of the reference dots, the dot pattern can be made unrecognizable to audiences by displaying the dot pattern approximately 1 to 2 frames for each 10 to 30 frames with video which is displayed by a display device at 30 frames/second, approximately 1 to 4 frames for each 20 to 60 frames with video which is displayed at 60 frames/second. To make the dot pattern even harder to recognize, pixel colors which are hard to be recognized may be used with a precondition in which the pixel color of the dots and the pixel color of the contrast region are recognizable from surrounding pixel colors.

Second Embodiment

The display format of a dot matrix 102 of the second embodiment will be described.

Figure 2:
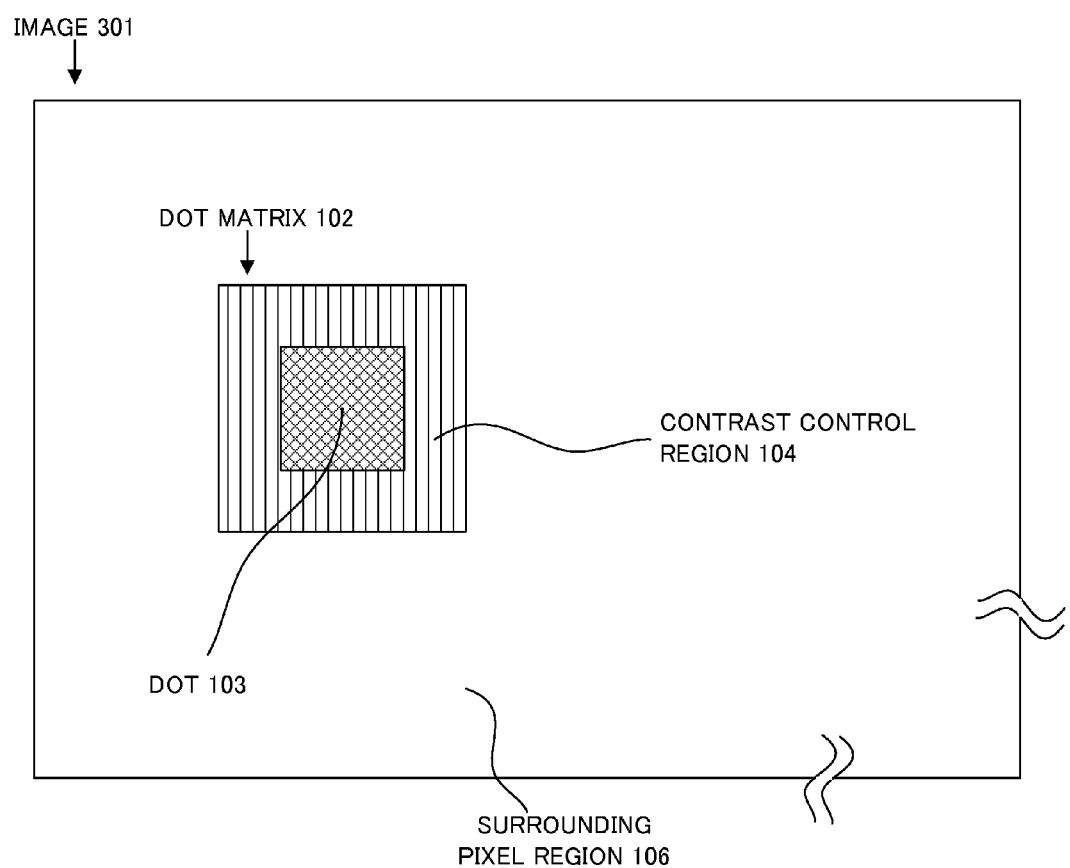
FIG. 2 is a diagram showing a dot matrix 102 of a second embodiment.

FIG. 2 is a diagram showing a dot matrix 102 comprising the dot pattern 101 displayed on a display device 201 in the second embodiment.

The clot matrix 102 comprises dots 103 and a contrast control region 104.

As shown in FIG. 2, the dots 103 are arranged at the innermost part of the dot matrix 102, and the contrast control region 104 is arranged to circumscribe the dots 103 without space therebetween.

<Contrast Control Region>

The contrast control region 104 will be described in details. This explanation will also be valid to the following other embodiments.

The color of the contrast control region 104 is displayed as a complementary color of the color of the dots 103. Having the contrast control region 104, the location of the dots 103 can be accurately recognized upon analyzing the image.

Specifically, if the pixel color of the dots 103 is a chromatic color, the pixel color of the contrast control region 104 is made an achromatic color. If the pixel color of the dots 103 is an achromatic color, the pixel color of the contrast control region 104 is made a chromatic color.

Further, if the pixel color of the dots 103 is black, the pixel color of the contrast control region 104 is made white. If the pixel color of the dots 103 is white, the pixel color of the contrast control region 104 is made black.

The pixel color of the contrast control region 104 is a pixel color distinguishable from the pixel colors of the surrounding pixel region 106, and the pixel color of the dots 103 is a pixel color distinguishable from the pixel colors of the contrast control region 104.

Further, if the compression standard of an image or video including the dot pattern 101 is irreversible compression, the size of the contrast control region 104 is preferably around 2 to 4 pixels×2 to 4 pixels in consideration of the influences from the surrounding pixel region 106.

Third Embodiment

The display format of a dot matrix 102 of the third embodiment will be described.

Figure 3:
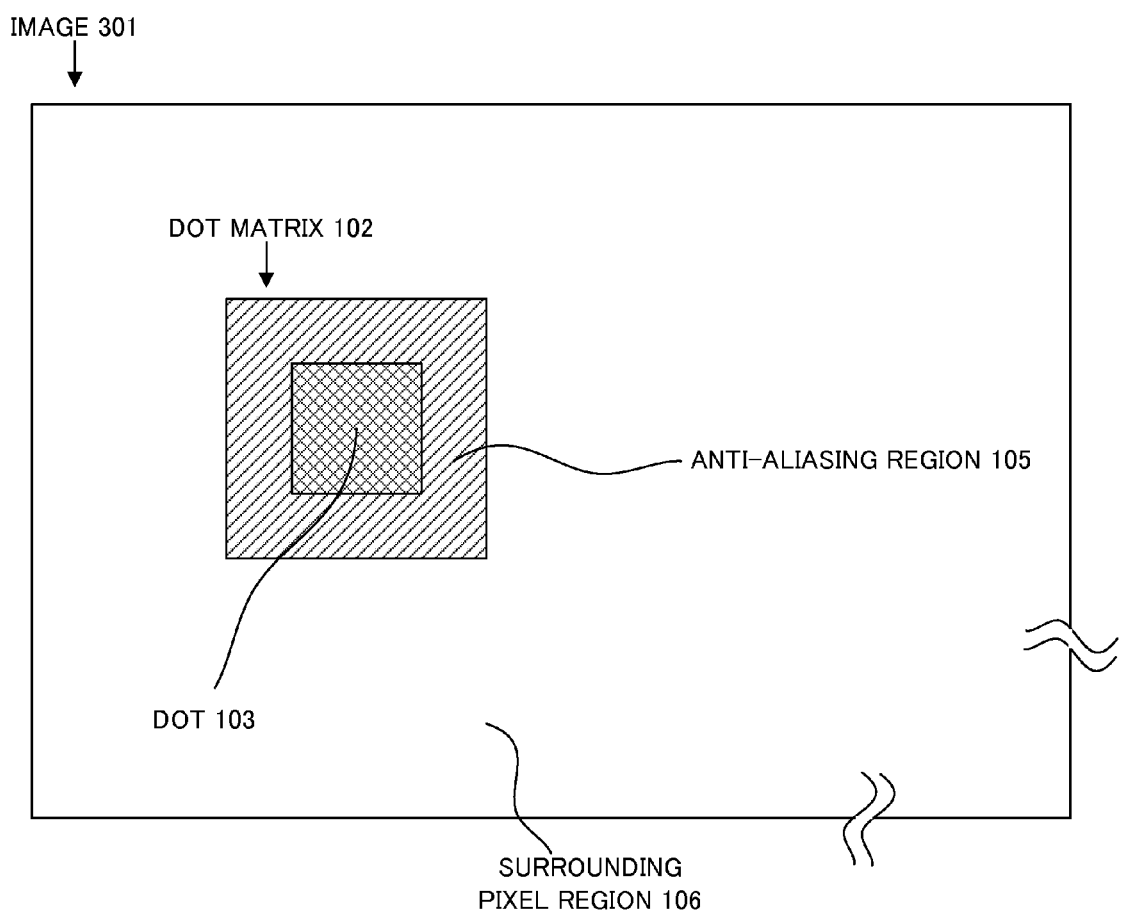
FIG. 3 is a diagram showing a dot matrix 102 of a third embodiment.

FIG. 3 is a diagram showing a dot matrix 102 comprising the dot pattern 101 displayed on a display device 201 in the third embodiment.

The dot matrix 102 comprises dots 103 and an anti-aliasing region 105.

As shown in FIG. 3, the dots 103 are arranged at the innermost part of the dot matrix 102, and the anti-aliasing region 105 is arranged to circumscribe the dots 103 without space therebetween.

<Anti-Aliasing Region>

The anti-aliasing region 105 will be described in details. This explanation will also be valid to the following other embodiments.

Anti-aliasing is generally an approach of arranging intermediate colors around a border of an image displayed on a screen of a computer, for diminishing the stairstep-like indentations (jaggies) which appear on diagonal lines and curved lines.

The anti-aliasing region in the present invention refers to a region where pixel colors gradually change from the pixel colors of the surrounding pixel region 106 to the pixel color of the dots 103. Having the anti-aliasing region 105, the transition of colors from the surrounding pixel region 106 to the dots 103 becomes smooth so that the dot matrix 102 is not conspicuous to audiences and the aesthetics of the image 301 are not harmed.

Further, if the compression standard of an image or video including the dot pattern 101 is irreversible compression, the size of the anti-aliasing region 105 is preferably around 2 to 4 pixels×2 to 4 pixels in consideration of the influences from the surrounding pixel region 106.

Using such a display format, the dot pattern 101 can be displayed on the display device 201 without causing a sense of discomfort to audiences by harming aesthetics.

Fourth Embodiment

The display format of a dot matrix 102 in the fourth embodiment will be described.

Figure 4:
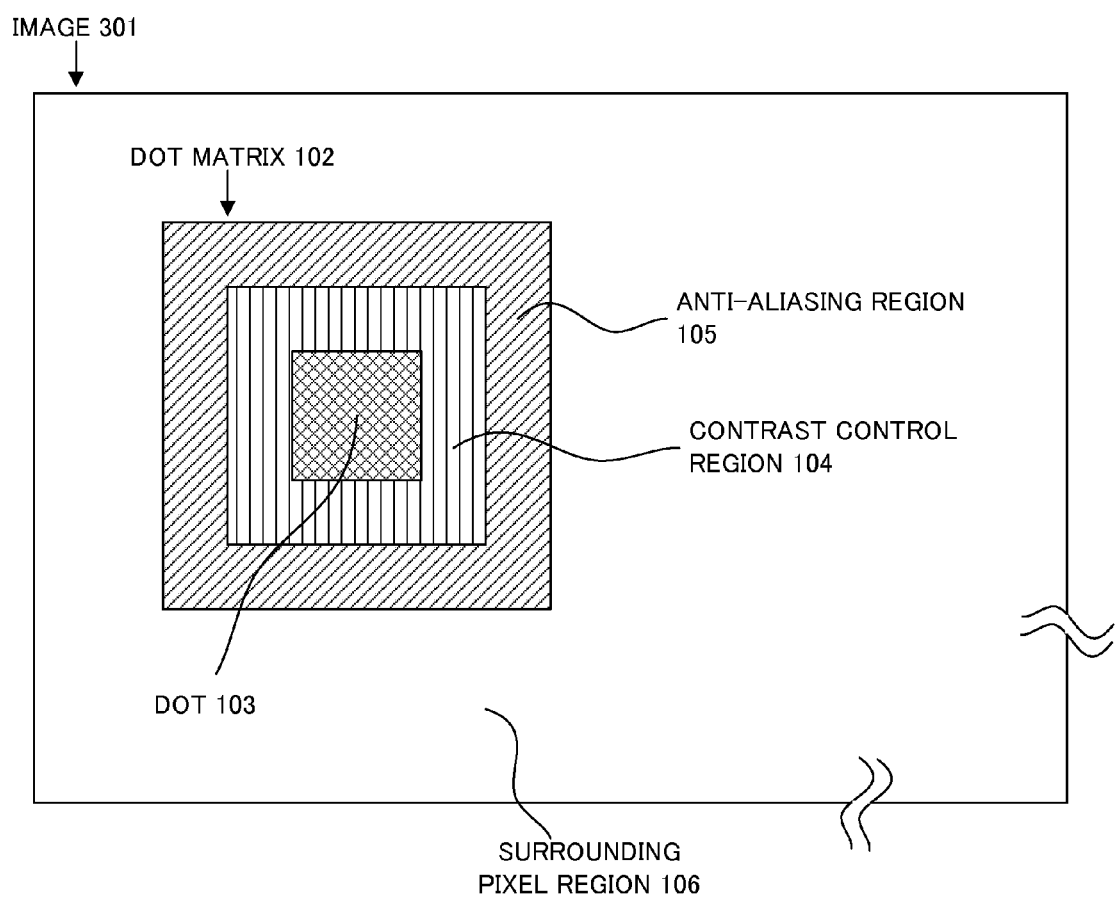
FIG. 4 is a diagram showing a dot matrix 102 of a fourth embodiment.

FIG. 4 is a diagram showing a dot matrix 102 comprising the dot pattern 101 displayed on a display device 201 in the fourth embodiment.

The dot matrix 102 comprises dots 193, a contrast control region 104, and an anti-aliasing region 105.

As shown in FIG. 4, the dots 103 are arranged at the innermost part of the dot matrix 102, and the contrast control region 104 is arranged to circumscribe the dots 103 without space therebetween. Then, the anti-aliasing region 105 is arranged to circumscribe the contrast control region 104 without space therebetween.

The anti-aliasing region 105 in the fourth embodiment refers to a region where pixel colors gradually change from the pixel colors of the surrounding pixel region 106 to the pixel color of the contrast control region 104. Having the anti-aliasing region 105, the transition of colors from the surrounding pixel region 106 to the contrast control region 104 becomes smooth so that the dot matrix 102 is not conspicuous to audiences and the aesthetics of the image 301 are not harmed.

<Arrangement Shape of Dots>

Figure 5:
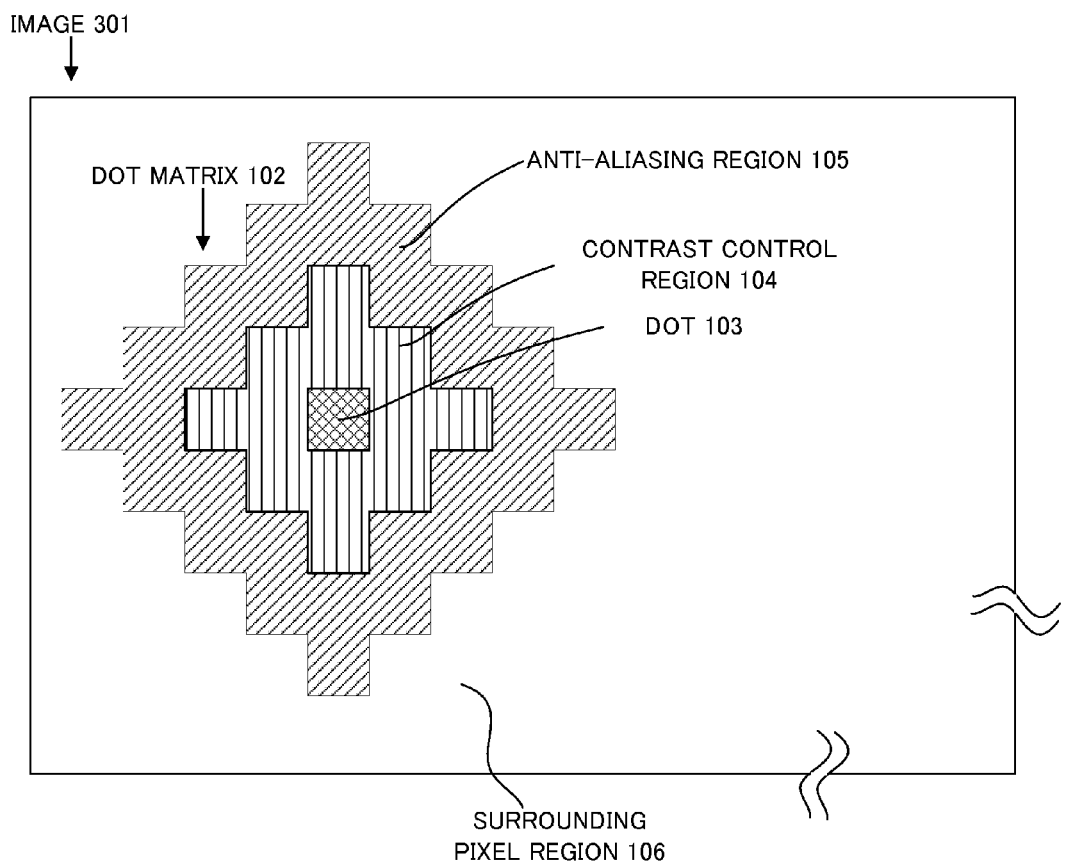
FIG. 5 is a diagram showing a dot matrix 102 of other shape.

It should be noted that, while, in the examples of FIGS. 1 to 4, a unit of the dot matrix 102 is arranged in a vertical and horizontal grid, a unit of the dot matrix 102 may be arranged in a diagonal grid as shown in FIG. 5.

<Dot Pattern>

The following will describe how the dot pattern 101 defines information in the present invention.

The dot pattern 101 defines information in accordance with the arrangement rule of the dot matrix 102.

As a method of defining the arrangement rule of the dot matrix 102 and information, known methods as exemplified in Publication of Japanese Patent No. 3706385 and Publication of Japanese Patent No. 3771252 can be utilized.

It should be noted that, while Publication of Japanese Patent No. 3706385 and Publication of Japanese Patent No. 3771252 mainly describe dot patterns printed on a medium instead of dot patterns displayed on a display device, the dot patterns 101 displayed on a display device and dot patterns printed on a medium have basically no difference as for the arrangement rule of dots and methods of defining information.

Figure 6:
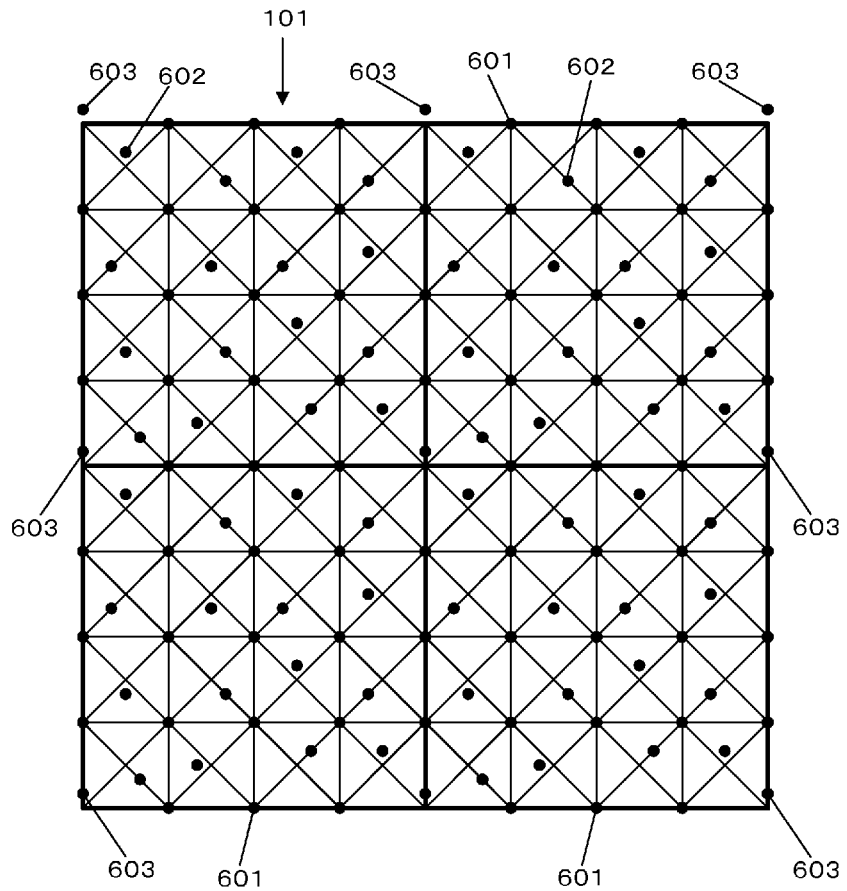
FIG. 6 is a diagram showing an example of the dot pattern 101.

FIG. 6 shows a dot pattern described in Publication of Japanese Patent No. 3706385 as a representative example of the dot pattern 101. The grid dots 601 (reference dots 601), information dots 602, key dots 603 of FIG. 6 are expressed in a dot matrix 102 which is the display format of the present invention.

Further, as shown in FIG. 6, a plurality of the dot patterns 101 are generally coupled or abutted one another in horizontal and vertical directions.

Figure 7A:
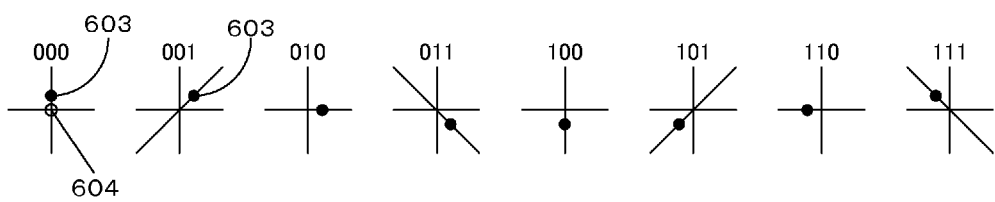
FIGS. 7A and 7B are diagrams showing examples of how to define information using an information dot 602.
Figure 7B:
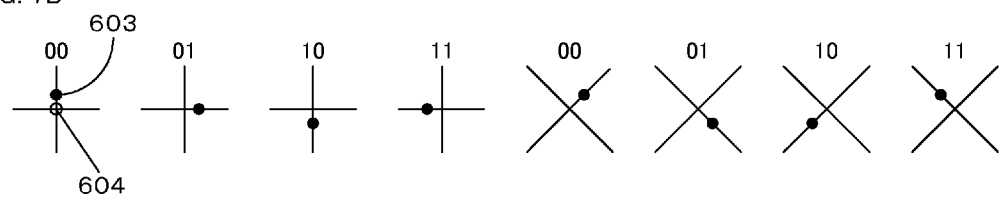

While the details are not described as the technique is known, an information dot 602 is arranged within a region surrounded by four grid dots 601, and information is defined by a distance and a direction (a vector) with reference to a virtual point 604 which is located at a center of the same region (refer to FIGS. 7A and 7B).

Alternatively, the information dot 602 defines information based on whether or not the information dot is arranged. Another way to define information is that the information dot 602 defines information by combining a vector and whether or not the information dot is arranged.

The key dot 603 is recognized as a key dot 603 by being arranged at a location where a part of evenly arranged grid dots 601 is shifted in a predetermined direction from the original location (upward direction in FIG. 6), and the key dot 603 defines the direction and size (border) of the dot pattern 101.

It should be noted that a variety of methods of defining the direction and size of the dot pattern have been known by Publication of Japanese Patent No. 3771252, such as, a method of defining the direction and size of a dot pattern by defining a part of information dots as a direction dot instead of a key dot and a method of defining the direction and size of a dot pattern by the arranged shape of the reference dots, which can be similarly applied to the dot pattern 101 of the present invention.

It should be noted that, while different wording are used for "lattice dots" as described in Publication of Japanese Patent No. 3706385 and "reference dots" as described in Publication of Japanese Patent No. 3771252, those functions are the same.

As shown in FIG. 6, unlike other two-dimensional codes, such as QR codes (registered trademark) and the like, the dot patterns 101 are unnoticeable to the audiences as the dot matrixes 102 are spaced.

As shown in FIG. 8, the dot pattern 101 may include X and Y coordinate information and other code information (dot codes) in one block as a unit of information.

Further, in the present invention, the dot pattern 101 can also define a dot code and/or X and Y coordinates based on the pixel color of the dots 103, the pixel color of a contrast control region 104, or a combination of these pixel colors.

The reference dots 601 (or information dots 602) are preferably arranged at predefined locations in the image 301. Whether a dot pattern 101 exists within an image 301 is easily determined by whether or not reference dots 601 are displayed at the predefined locations.

<Other Dot Pattern>

The dot pattern 101 may comprise only information dots 602. In such a case, the information dot 602 defines information by whether or not the information dot 602 is arranged at a predefined position or the distance and direction from a predetermined position.

<Problem Inherent to Display Format>

The following will describe the result of a new experiment which the inventor has implemented to solve the problem inherent to when displaying the dot patterns 101 on a display device 201.

<Size of Dot Matrix>

The smaller the dot matrix 102 is, the more unnoticeable the dot matrix 102 becomes to the audiences and lesser the dot matrix 102 harms the aesthetics of the image 3. The dot pattern 101 can be appropriately displayed with any generally available display device when the size of the dot matrix 102 is approximately 2 to 4 pixels×2 to 4 pixels in the first embodiment, excluding one pixel affected by a disorder of the display device in case using a display device with half or full high definition resolution or more, and in consideration of influences from the surrounding pixel region 106.

For the second embodiment, the dot pattern 101 can be appropriately displayed with any generally c display device when the size of the dot matrix 102 is approximately 4 to 8 pixels×4 to 8 pixels.

For the third embodiment, the dot pattern 101 can be appropriately displayed with any generally available display device when the size of the dot matrix 102 is approximately 4 to 8 pixels×4 to 8 pixels.

For the fourth embodiment, the dot pattern 101 can be appropriately displayed with any generally available display device when the size of the dot matrix 102 is approximately 6 to 12 pixels×6 to 12 pixels.

It will be appreciated that the size of the dot matrix 102 may be larger when only one or a few dot patterns are embedded as in a case of QR codes (registered trademark). In such a case, if the dot pattern is supposed to be noticeable, the dot pattern will be displayed continuously for arbitrary time on the display device. Whereas the dot patterns can be made unrecognizable to audiences by displaying the dot patterns approximately 1 to 2 frames for each 10 to 30 frames with video which is displayed by the display device at 30 frames/second, approximately 1 to 4 frames for each 20 to 60 frames with video which is displayed at 60 frames/second. To make the dot patterns even harder to recognize, a pixel color which is hard to be recognized may be used with a precondition in which the pixel color of the dots and the pixel color of the contrast region are recognizable from the surrounding pixel colors.

<Arrangement Interval of Dot Matrix>

The dot pattern 11 is appropriately displayed with any generally available display device when the arrangement interval of the dot matrixes 102 is approximately 10 to 40 pixels in case using a display device with half or full high definition resolution or more. It will be appreciated that the arrangement interval of the dot matrixes 102 may be wider when one or a few dot patterns axe embedded as in a case of QR codes (registered trademark).

<Distance Between Virtual Point and Information Dot>

The dot pattern 11 is appropriately displayed with any generally available display device and the information dots 602 can be recognized when the distance between a virtual point 604 and an information dot 602 is approximately 10 to 30% of the interval between reference dots 601

<Shift Distance of Key Dot>

The dot pattern 11 is appropriately displayed with any generally available display device and the key dots 602 can be recognized when a distance which a key dot 603 is shifted from a location where a grid dot 601 is arranged is approximately 10 to 30% of the interval of reference dots.

<Service Using the Present Invention>

FIG. 9 is a diagram illustrating a display device 201 which displays the dot pattern 101 (machine-readable dot pattern) of the present invention.

As shown in FIG. 9, the display device 201 is displaying an image 301. The image 301 includes the dot pattern 101 apart from the visual information to be viewed by the audiences. While, according to FIG. 5, the dot matrixes 102 are distributed over the whole image 301, the dot matrixes 102 may be distributed only to a certain area of the image 301.

Figure 12:
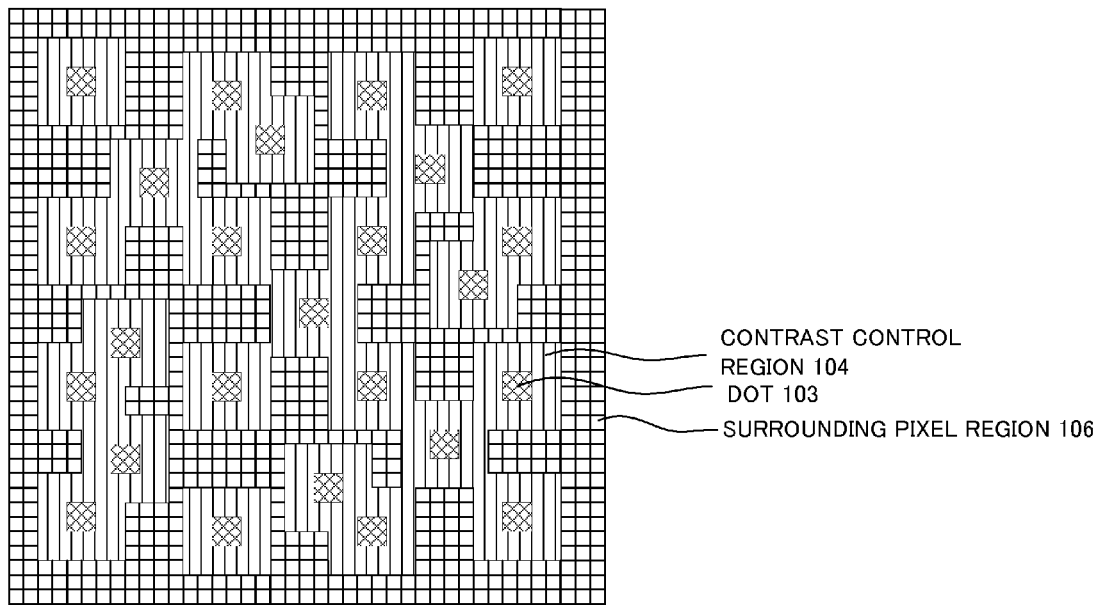
FIG. 12 is a diagram showing a dot pattern 101 which comprises the dot matrix 102 of the second embodiment.
Figure 13:
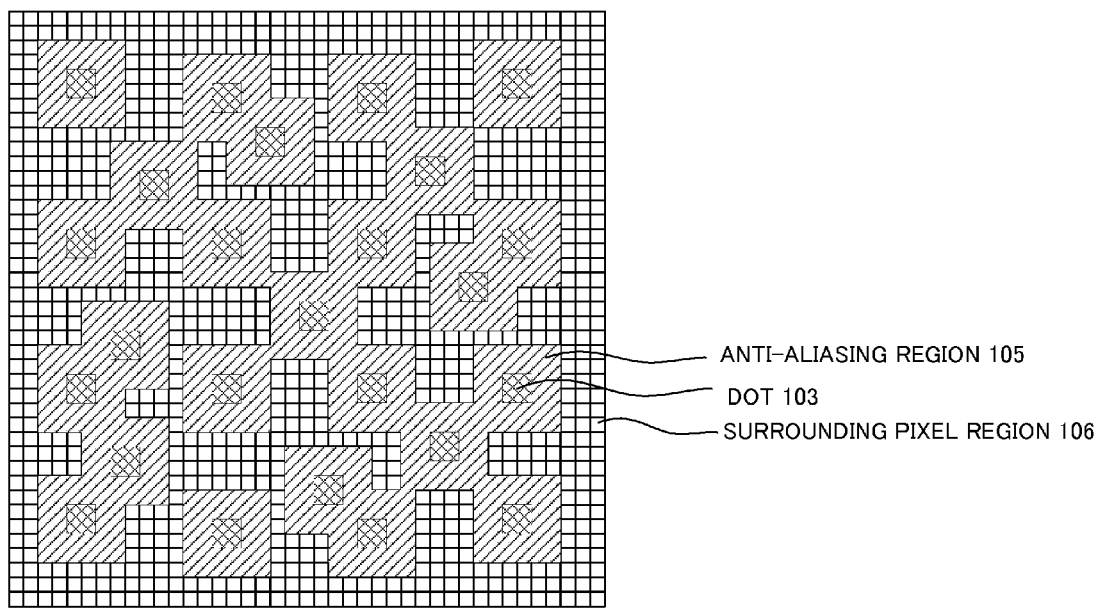
FIG. 13 is a diagram showing a dot pattern 101 which comprises the dot matrix 102 of the third embodiment.
Figure 14:
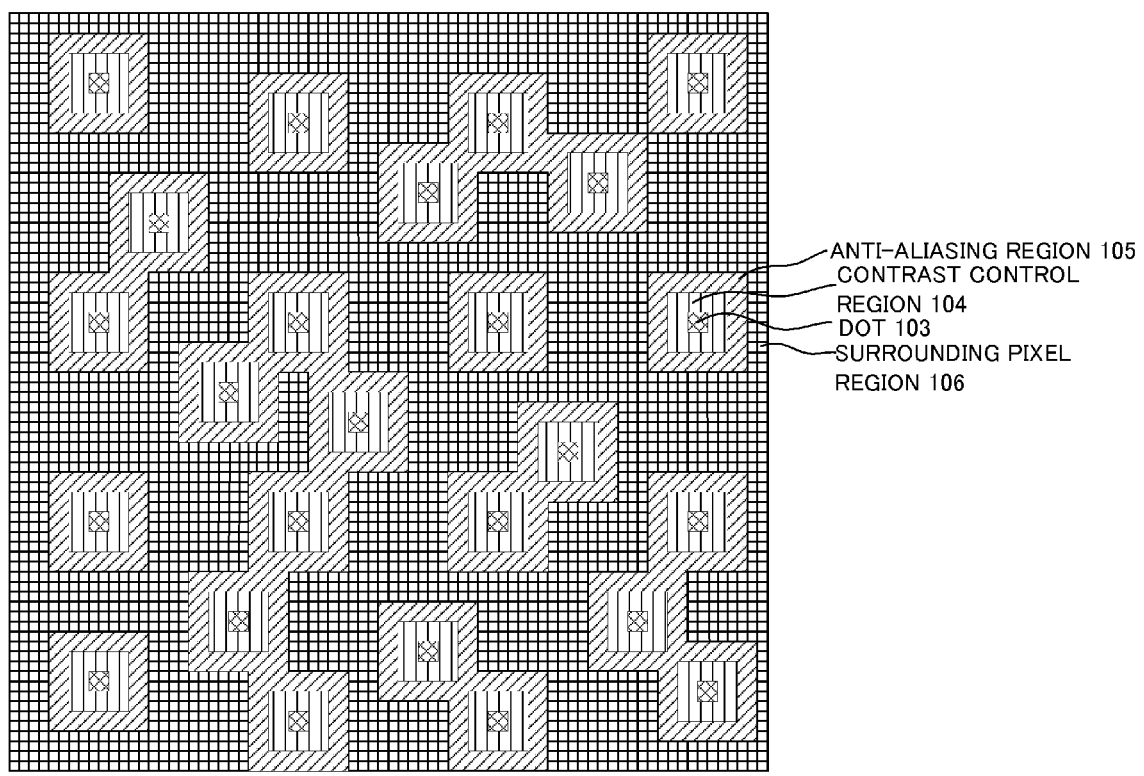
FIG. 14 is a diagram showing a dot pattern 101 which comprises the dot matrix 102 of the fourth embodiment.

FIGS. 12 to 14 show display examples of the dot pattern 101 when the dot matrixes 102 comprise contrast control regions or anti-aliasing regions, or both.

When the image 301 is one frame of video 501 of a television program, the dot pattern 101 defines information such as the title of the program, an introduction of the content of the program, casts or staff of the program, the URL of an official web site of the program, the URL of a web site which sells related products of the program, and the like.

Figure 10:
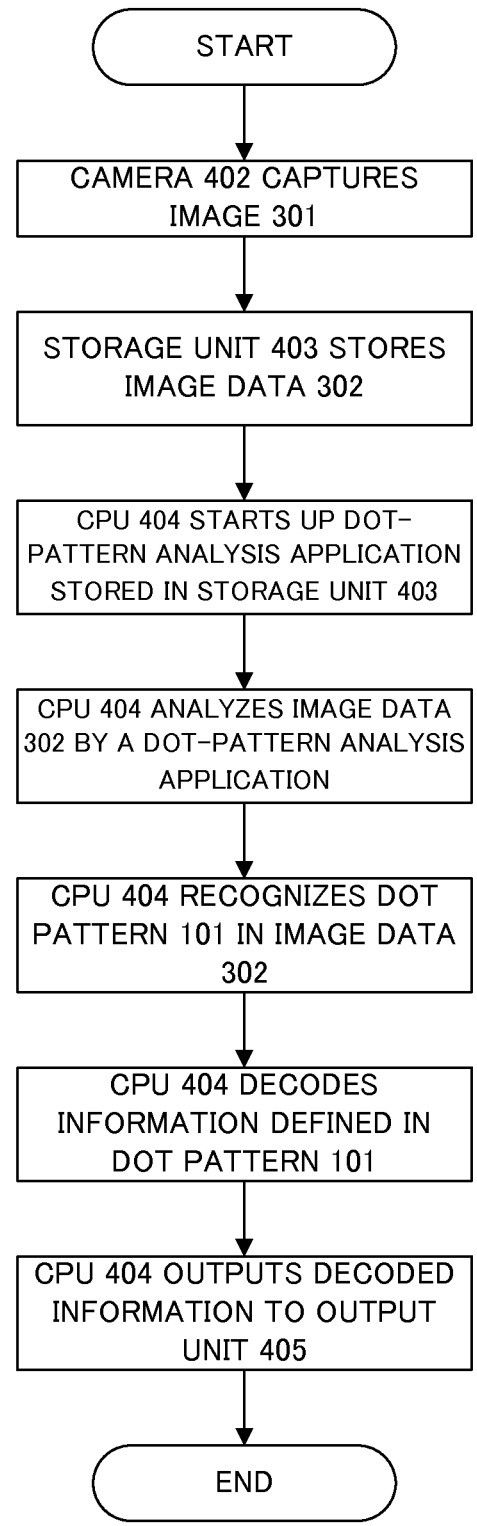
FIG. 10 is a diagram illustrating a procedure for an audience to utilize a service using the present invention.

The procedure when an audience utilizes the service using the present invention will be exemplified with reference to FIG. 10.

(1) The camera 402 captures an image 301.

(2) The storage unit 403, not shown, in the terminal 401 stores the image data 302 captured by the camera 402.

(3) The CPU 404, not shown, in the terminal 401 starts up a dot pattern analysis application stored in the storage unit 403.

(4) The CPU 404 analyzes the image data 302 using the dot pattern analysis application.

(5) The CPU 404 recognizes the dot pattern 101 inside the image data 302, and decodes information defined in the dot pattern 101.

(6) The CPU 404 outputs the decoded information to the output unit 405, not shown, of the terminal 401, and the audience browses the information.

It should be noted that the service provider can arbitrarily design whether the dot pattern 101 directly defines information or the dot pattern 101 defines a numerical value which is associated with information, depending on the amount of information which can be defined by the dot pattern 101.

Further, in the above procedure, it will be appreciated without explanation that the service provider can arbitrarily design a configuration, in which a terminal 401 sends image data 302 to a server 406, not shown, where the dot pattern 101 in the image data 302 is analyzed and information is decoded, and the terminal 401 receives back the decoded information.

<Compression and Expansion of Image>

If video 501 (an image 301) displayed on the display device 201 is compressed using an irreversible video compression standard, the RGB values of the dots 103 change affected by the surrounding pixel region 106 when the video 501 is compressed and expanded.

Therefore, when designing a dot pattern 101, anticipation of the change of RGB values caused by compression and expansion is required in designing.

In the present invention, the influences from the surrounding pixel region 106 to the dots 103 caused by compression and expansion is alleviated, as the contrast control region 101 and the anti-aliasing region 105 are provided around the dots 103.

Further, it will be appreciated that the influences from the surrounding pixel region 106 to the dots 103 caused by compression and expansion is also alleviated by enlarging the sizes of the dots 103.

<Frame Displaying Dot Pattern>

To make the dot pattern 101 unnoticeable to the audiences, the dot pattern 101 is preferably displayed only part of the frames of the video 501 instead of all the frames.

<Index>

Figure 11:
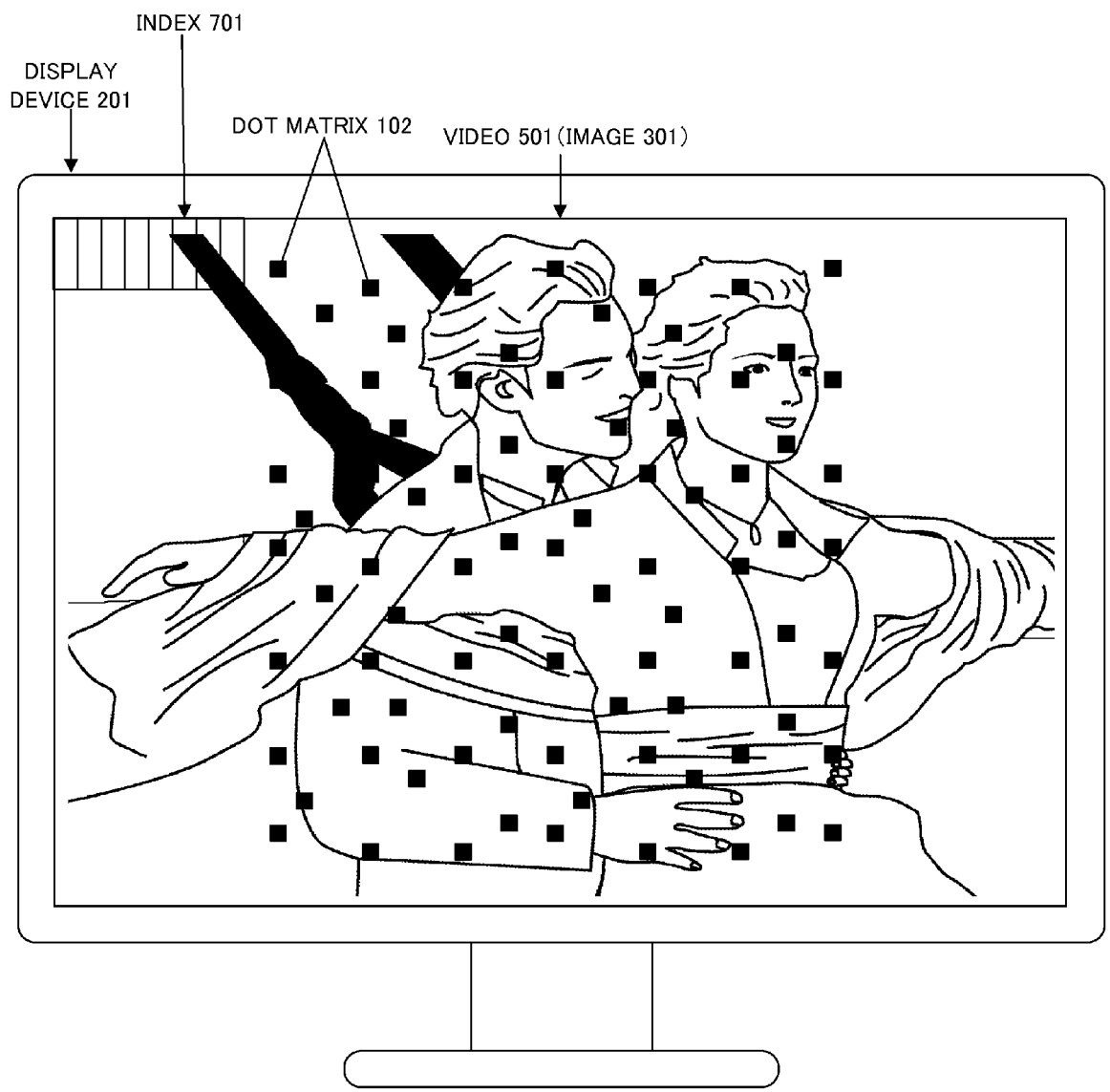
FIG. 11 is a diagram showing an example of embedding an index 701.

Preferably, as shown in FIG. 11, a known index 701 (watermark information) which can be imaged by a camera 102 is embedded at the end of video 501 (an image 301) besides the dot pattern 101.

The index 701 indicates information that the dot pattern 101 is embedded in one frame of the captured video 501, in this way, only the frame is captured to analyze the dot code.

<Utility Example of the Invention>

The present invention as described so far is about a display format using a display device for machine-readable dot patterns. However, the present invention can also be utilized as a device and a method for displaying machine-readable dot patterns, a device and a method for generating an image including machine-readable dot patterns, or an image generating program. Further, the invention may also be used for other devices, methods, and programs.

INDUSTRIAL APPLICABILITY

The present invention embodies industrial applicability as a display format for adding information when delivering video or images to display devices, typically in television broadcasts.

DESCRIPTION OF REFERENCE NUMERALS AND SIGNS

101 DOT PATTERN
102 DOT MATRIX
103 DOT
104 CONTRAST CONTROL REGION
105 ANTI-ALIASING REGION
106 SURROUNDING PIXEL REGION
201 TELEVISION
301 IMAGE
302 IMAGE DATA
401 TERMINAL
402 CAMERA
403 STORAGE UNIT
404 CPU
405 OUTPUT UNIT
406 SERVER
501 VIDEO
601 GRID DOT (REFERENCE DOT)
602 INFORMATION DOT
603 KEY DOT
604 VIRTUAL ANT
701 INDEX

The invention claimed is:

1. A display format for a dot pattern displayed on a display device, wherein the display format is for displaying, using the display device, the dot pattern where a plurality of dots are arranged with video and/or an image over a whole region or at least one predetermined region of at least a predetermined frame for displaying video and/or the image, and the plurality of dots comprise a plurality of information dots or the plurality of information dots and reference dots, each of the dots comprises a contrast control region which has a different pixel color and is distinguishable from each surrounding pixel region of the dots, and each of the dots comprises an anti-aliasing region where pixel colors gradually change from each surrounding pixel region of the dots to the contrast control region.

2. A display format for a dot pattern displayed on a display device, wherein the display format is for displaying, using the display device, the dot pattern where a plurality of dots are arranged with video and/or an image over a whole region or at least one predetermined region of at least a predetermined frame for displaying video and/or the image, and the plurality of dots comprise a plurality of information dots or the plurality of information dots and reference dots, and comprising a contrast control region which is distinguishable from the dots, and each of the dots comprises an anti-aliasing region where pixel colors gradually change from each surrounding pixel region of the dots to the contrast control region.

3. The display format for the dot pattern according to claim 1, wherein
the pixel color of the contrast control region is a complimentary color of the pixel color of the dots.

4. The display format for the dot pattern according to claim 1, wherein either
(i) the pixel color of the contrast control region is an achromatic color, and the pixel color of the dots is a chromatic color; or
(ii) the pixel color of the contrast control region is a chromatic color, and the pixel color of the dots is an achromatic color.

5. The display format for the dot pattern according to claim 1, wherein either
(i) the pixel color of the contrast control region is white, and the pixel color of the dots is black; or
(ii) the pixel color of the contrast control region is black, and the pixel color of the dots is white.

6. The display format for the dot pattern according to claim 1 or 2, wherein
the pixel color of the dots is distinguishable from the pixel colors of the surrounding pixel region.

7. The display format for the dot pattern according to claim 1, wherein
the pixel color of the contrast control region is distinguishable from the pixel colors of the surrounding pixel region, and
the pixel color of the dots is distinguishable from the pixel color of the contrast control region.

8. The display format for the dot pattern according to claim 1 or 2, wherein
in the dot pattern, a dot code is defined by determining: a region where the dot code and/or a set of X and Y coordinates are defined; an orientation of the dot pattern; and arrangements of the information dots, with reference to the reference dots arranged in accordance with the predetermined rule.

9. The display format for the dot pattern according to claim 8, wherein
a plurality of dot patterns, in each of which the dot code and/or X and Y coordinates are defined, are provided in the predetermined region by coupling or abutting one another in vertical and horizontal directions.

10. The display format for the dot pattern according to claim 1, wherein
in the dot pattern, the dot code and/or X and Y coordinates are defined by the pixel colors of the dots and/or the contrast control region.

11. The display format for the dot pattern according to claim 1 or 2, wherein
whether the dot pattern is being displayed or not can be judged by whether or not the plurality of information dots or the plurality of information dots and reference dots are arranged at a predetermined position in the predetermined frame.

12. The display format for the dot pattern according to claim 1 or 2, wherein
when displaying the dot pattern, an index for identifying an image displayed on the display device is displayed in a same frame as a frame displaying the dot pattern.

13. A dot pattern information terminal comprising:
a camera that reads the dot pattern according to claim 1 or 2.

14. The dot pattern information terminal according to claim 13, further comprising:
an analysis unit that analyzes the dot pattern and decode information defined by the dot pattern.

15. The dot pattern information terminal according to claim 14, further comprising:
an output unit that outputs decoded information.

16. A reading method of a dot pattern comprising:
reading the dot pattern according to claim 1 or 2.

17. The reading method of the dot pattern according to claim 16, further comprising:
analyzing the dot pattern, and
decoding information defined by the dot pattern.

18. An information processing method using a dot pattern, comprising:
reading the dot pattern according to claim 1 or 2,
analyzing the dot pattern,
decoding information defined by the dot pattern, and
outputting decoded information.

19. A display device displaying the dot pattern according to claim 1 or 2.

20. An image generation device generating an image including the dot pattern according to claim 1 or 2.

21. A generation method of an image including the dot pattern pattern according to claim 1 or 2.

22. A broadcasting device broadcasting an image including the dot pattern according to claim 1 or 2.

23. A delivering device delivering an image including the dot pattern according to claim 1 or 2.

24. The display format for the dot pattern according to claim 1 or 2, wherein
the dot pattern is displayed only a predetermined number of frames at a predetermined frame interval.

25. The display format for the dot pattern according to claim 24, wherein, when the video is displayed on the display device at 30 frames/second, the dot pattern is displayed 1 to 2 frames for each 10 to 30 frames, and
when the video is displayed on the display device at 60 frames/second, the dot pattern is displayed 1 to 4 frames for each 20 to 60 frames.

26. The display format for the dot pattern according to claim 24, wherein,
in the predetermined frame interval, the dot pattern is displayed at a first frame, only the dot pattern is hidden at a second frame, and the first frame and the second frame are alternately displayed.

27. The display format for the dot pattern according to claim 26, wherein,
when the video is displayed on the display device at 30 frames/second, the video is displayed at 1 to 2 first frames and 10 to 30 second frames, and
when the video is displayed on the display device at 60 frames/second, the video is displayed at 1 to 4 first frames and 20 to 60 second frames.

* * * * *